(12) United States Patent
Hofmann et al.

(10) Patent No.: US 10,883,528 B2
(45) Date of Patent: Jan. 5, 2021

(54) SYSTEMS AND METHODS FOR STRUCTURALLY INTERRELATING COMPONENTS USING INSERTS MADE FROM METALLIC GLASS-BASED MATERIALS

(71) Applicant: California Institute of Technology, Pasadena, CA (US)

(72) Inventors: Douglas C. Hofmann, Altadena, CA (US); Samuel C. Bradford, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 13 days.

(21) Appl. No.: 16/178,124

(22) Filed: Nov. 1, 2018

(65) Prior Publication Data

US 2019/0195269 A1 Jun. 27, 2019

Related U.S. Application Data

(63) Continuation of application No. 15/067,561, filed on Mar. 11, 2016, now Pat. No. 10,174,780.

(Continued)

(51) Int. Cl.
*F16B 35/04* (2006.01)
*F16B 37/12* (2006.01)
(Continued)

(52) U.S. Cl.
CPC .......... *F16B 35/041* (2013.01); *F16B 33/006* (2013.01); *F16B 33/02* (2013.01);
(Continued)

(58) Field of Classification Search
CPC .... F16B 35/041; F16B 37/122; F16B 33/006; F16B 33/02; B29L 2009/003; B29K 2063/00
See application file for complete search history.

(56) References Cited

U.S. PATENT DOCUMENTS 3,435,512 A 4/1969 Macrobbie
3,529,457 A 9/1970 Bowers
(Continued)

FOREIGN PATENT DOCUMENTS

CN 101709773 A 5/2010
CN 102563006 A 7/2012
(Continued)

OTHER PUBLICATIONS

Hofmann et al., "Designing metallic glass matrix composites with high toughness and tensile ductility", Nature Letters, Feb. 28, 2008, vol. 451, pp. 1085-1090.
(Continued)

*Primary Examiner* — John C Hong
(74) *Attorney, Agent, or Firm* — KPPB LLP

(57) ABSTRACT

Systems and methods in accordance with embodiments of the invention operate to structurally interrelate two components using inserts made from metallic glass-based materials. In one embodiment, a method of structurally interrelating two components includes: forming an insert from a metallic glass-based composition; where the formed insert includes a metallic glass-based material; affixing the insert to a first component; and structurally interrelating the second component to the first component using the insert.

18 Claims, 8 Drawing Sheets

Related U.S. Application Data

(60) Provisional application No. 62/131,467, filed on Mar. 11, 2015.

(51) Int. Cl.
*F16B 33/02* (2006.01)
*F16B 33/00* (2006.01)
*B29K 63/00* (2006.01)
*B29L 9/00* (2006.01)

(52) U.S. Cl.
CPC ........ *F16B 37/122* (2013.01); *B29K 2063/00* (2013.01); *B29L 2009/003* (2013.01)

(56) References Cited

U.S. PATENT DOCUMENTS

| | | |
|---|---|---|
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk |
| 4,173,393 A | 11/1979 | Maurer |
| 4,202,404 A | 5/1980 | Carlson |
| 4,711,795 A | 12/1987 | Takeuchi et al. |
| 4,749,625 A | 6/1988 | Obayashi et al. |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,168,918 A | 12/1992 | Okuda et al. |
| 5,288,344 A | 2/1994 | Peker et al. |
| 5,310,432 A | 5/1994 | Yamanaka et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,496,077 B2 | 7/2013 | Nesnas et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 10,487,934 B2 | 11/2019 | Kennett et al. |
| 10,690,227 B2 | 6/2020 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0052105 A1 | 3/2003 | Nagano et al. |
| 2003/0062811 A1 | 4/2003 | Peker et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0263932 A1 | 12/2005 | Heugel |
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2009/0011846 A1 | 1/2009 | Scott |
| 2009/0114317 A1 | 5/2009 | Collier et al. |
| 2009/0194205 A1 | 8/2009 | Loffler et al. |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0133080 A1 | 5/2012 | Moussa et al. |
| 2012/0289946 A1 | 11/2012 | Steger |
| 2013/0009338 A1 | 1/2013 | Mayer |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0280547 A1 | 10/2013 | Brandl et al. |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0093674 A1* | 4/2014 | Hofmann ................ F16H 55/17 428/66.1 |
| 2014/0141164 A1 | 5/2014 | Hofmann |
| 2014/0202595 A1 | 7/2014 | Hofmann |
| 2014/0203622 A1 | 7/2014 | Yamamoto et al. |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0047463 A1 | 2/2015 | Hofmann et al. |
| 2015/0068648 A1 | 3/2015 | Schroers et al. |

(56) References Cited

U.S. PATENT DOCUMENTS

| | | | |
|---|---|---|---|
| 2015/0075744 | A1 | 3/2015 | Hofmann et al. |
| 2015/0158067 | A1 | 6/2015 | Kumar et al. |
| 2015/0289605 | A1 | 10/2015 | Prest et al. |
| 2015/0298443 | A1 | 10/2015 | Hundley et al. |
| 2015/0314566 | A1 | 11/2015 | Mattlin et al. |
| 2015/0323053 | A1 | 11/2015 | El-Wardany et al. |
| 2016/0178047 | A1 | 6/2016 | Kennett et al. |
| 2016/0186850 | A1 | 6/2016 | Hofmann et al. |
| 2016/0258522 | A1 | 9/2016 | Hofmann et al. |
| 2016/0263937 | A1 | 9/2016 | Parness et al. |
| 2016/0265576 | A1 | 9/2016 | Hofmann et al. |
| 2016/0299183 | A1 | 11/2016 | Lee |
| 2016/0361897 | A1 | 12/2016 | Hofmann et al. |
| 2017/0121799 | A1 | 5/2017 | Hofmann et al. |
| 2017/0137955 | A1 | 5/2017 | Hofmann et al. |
| 2017/0226619 | A1 | 8/2017 | Hofmann et al. |
| 2018/0119259 | A1 | 5/2018 | Hofmann et al. |
| 2018/0257141 | A1 | 9/2018 | Hofmann et al. |
| 2019/0126674 | A1 | 5/2019 | Parness et al. |
| 2019/0154130 | A1 | 5/2019 | Hofmann et al. |
| 2020/0318721 | A1 | 10/2020 | Hofmann et al. |

FOREIGN PATENT DOCUMENTS

| | | |
|---|---|---|
| CN | 103153502 A | 6/2013 |
| DE | 102010062089 A1 | 5/2012 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| JP | 61276762 A | 12/1986 |
| JP | 09121094 A | 5/1997 |
| JP | 2002045960 A | 2/2002 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 5249932 B2 | 7/2013 |
| JP | 2013238278 A | 11/2013 |
| JP | 2013544648 A | 12/2013 |
| KR | 101420176 B1 | 7/2014 |
| WO | 2007038882 A1 | 4/2007 |
| WO | 2008156889 A2 | 12/2008 |
| WO | 2009069716 A1 | 6/2009 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2018165662 A1 | 9/2018 |

OTHER PUBLICATIONS

Hofmann et al., "Improving Ductility in Nanostructured Materials and Metallic Glasses: Three Laws", Material Science Forum, vol. 633-634, 2010, pp. 657-663, published online Nov. 19, 2009.

Hofmann et al., "Semi-solid Induction Forging of Metallic Glass Matrix Composites", JOM, Dec. 2009, vol. 61, No. 12, pp. 11-17, plus cover.

Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.

Hu et al., "Crystallization Kinetics of the $Cu_{47.5}Zr_{74.5}Al_5$ Bulk Metallic Glass under Continuous and Iso-thermal heating", App. Mech. and Materials, vols. 99-100, Sep. 8, 2011, p. 1052-1058.

Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.

Huang et al., "Fretting wear behavior of bulk amorphous steel", Intermetallics, Jun. 12, 2011, vol. 19, pp. 1385-1389.

Inoue et al., "Cobalt-based bulk glassy alloy with ultrahigh strength and soft magnetic properties", Nature Materials, Sep. 21, 2003, vol. 2, pp. 661-663.

Inoue et al., "Development and applications of late transition metal bulk metallic glasses", Bulk Metallic Glasses, pp. 1-25, 2008.

Inoue et al., "Developments and applications of bulk metallic glasses", Reviews on Advanced Materials Science, Feb. 28, 2008, vol. 18, pp. 1-9.

Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.

Inoue et al., "Recent development and application products of bulk glassy alloys", Acta Materialia, Jan. 20, 2011, vol. 59, Issue 6, pp. 2243-2267.

Ishida et al., "Wear resistivity of super-precision microgear made of Ni-based metallic glass", Materials Science and Engineering, Mar. 25, 2007, vol. A449-451, pp. 149-154.

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

Jiang et al., "Tribological Studies of a Zr-Based Glass-Forming Alloy with Different States", Advanced Engineering Materials, Sep. 14, 2009, vol. 1, No. 11, pp. 925-931.

Johnson et al., "Quantifying the Origin of Metallic Glass Formation", Nature Communications, Jan. 20, 2016, vol. 7, 10313, 7 pgs. doi: 10.1038/ncomms10313.

Jung et al., "Fabrication of Fe-based bulk metallic glass by selective laser melting: A parameter study", Materials and Design, Jul. 30, 2015, vol. 86, pp. 703-708.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim, Junghwan et al. "Oxidation and crystallization mechanisms in plasma-sprayed Cu-based bulk metallic glass coatings", Acta Materialia., Feb. 1, 2010, vol. 58, pp. 952-962.

Kim et al., "Amorphous phase formation of Zr-based alloy coating by HVOF spraying process", Journal of Materials Science, Jan. 1, 2001, vol. 36, pp. 49-54.

Kim et al., "Design and synthesis of Cu-based metallic glass alloys with high glass forming ability", Journal of Metastable and Nanocrystalline Materials, Sep. 1, 2005, vols. 24-25, pp. 93-96.

Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.

Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9, pp. 1609-1613.

Kim et al., "Realization of high tensile ductility in a bulk metallic glass composite by the utilization of deformation-induced martensitic transformation", Scripta Materialia, May 3, 2011, vol. 65, pp. 304-307.

Kim et al., "Weldability of $Cu_{54}Zr_{22}Ti_{18}Ni_6$ bulk metallic glass by ultrasonic welding processing", Materials Letters, May 17, 2014, 130, pp. 160-163.

Kobayashi et al., "Fe-based metallic glass coatings produced by smart plasma spraying process", Materials Science and Engineering, Feb. 25, 2008, vol. B148, pp. 110-113.

(56) References Cited

OTHER PUBLICATIONS

Kobayashi et al., "Mechanical property of Fe-base metallic glass coating formed by gas tunnel type plasma spraying", ScienceDirect, Surface & Coatings Technology, Mar. 14, 2008, 6 pgs.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158.

Kozachkov et al., "Effect of cooling rate on the volume fraction of B2 phases in a CuZrAlCo metallic glass matrix composite", Intermetallics, Apr. 19, 2013, vol. 39, pp. 89-93.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

Kumar et al., "Bulk Metallic Glass: The Smaller the Better", Advanced Materials, Jan. 25, 2011, vol. 23, pp. 461-476.

Kwon et al., "Wear behavior of Fe-based bulk metallic glass composites", Journal of Alloys and Compounds, Jul. 14, 2011, vol. 509S, pp. S105-S108.

Launey et al., "Fracture toughness and crack-resistance curve behavior in metallic glass-matrix composites", Applied Physics Letters, Jun. 18, 2009, vol. 94, pp. 241910-1-241910-3.

Launey et al., "Solution to the problem of the poor cyclic fatigue resistance of bulk metallic glasses", PNAS Early Edition, pp. 1-6, Jan. 22, 2009.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948.

Li et al., "Selective laser melting of Zr-based bulk metallic glasses: Processing, microstructure and mechanical properties", Materials and Design, Sep. 21, 2016, vol. 112, pp. 217-226.

Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs., Jul. 1, 2008.

Lin et al., "Designing a toxic-element-free Ti-based amorphous alloy with remarkable supercooled liquid region for biomedical application", Intermetallics, Jul. 9, 2014, vol. 55, pp. 22-27.

List, A. et al. "Impact Conditions for Cold Spraying of Hard Metallic Glasses", Journal of Thermal Spray Technology, Jun. 1, 2012, vol. 21, No. 3-4, pp. 531-540.

Liu, X. Q. "Microstructure and properties of Fe-based amorphous metallic coating produced by high velocity axial plasma spraying", Science Direct, Journal of Alloys and Compounds, Apr. 23, 2009, vol. 484, pp. 300-307.

Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.

Liu et al., "Metallic glass coating on metals plate by adjusted explosive welding technique", Applied Surface Science, Jul. 16, 2009, vol. 255, pp. 9343-9347.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear behavior of a Zr-based bulk metallic glass and its composites", Journal of Alloys and Compounds, May 5, 2010, vol. 503, pp. 138-144.

Lupoi, R. et al. "Deposition of metallic coatings on polymer surfaces using cold spray", Science Direct, Surface & Coatings Technology, Sep. 6, 2010, vol. 205, pp. 2167-2173.

Ma et al., "Wear resistance of Zr-based bulk metallic glass applied in bearing rollers", Materials Science and Engineering, May 4, 2004, vol. A386, pp. 326-330.

Maddala et al., "Effect of notch toughness and hardness on sliding wear of $Cu_{50}Hf_{41.5}A_{18.5}$ bulk metallic glass", Scripta Materialia, Jul. 6, 2011, vol. 65, pp. 630-633.

Extended European Search Report for European Application No. 14889035.3, Search completed Dec. 4, 2017, dated Dec. 13, 2017, 10 Pgs.

International Preliminary Report on Patentability for International Application PCT/US2013/047950, dated Dec. 31, 2014, dated Jan. 8, 2015, 7 Pgs.

International Preliminary Report on Patentability for International Application PCT/US2013/050614, dated Jan. 20, 2015, dated Jan. 29, 2015, 9 Pgs.

International Preliminary Report on Patentability for International Application PCT/US2014/033510, dated Oct. 12, 2016, dated Oct. 20, 2016, 9 Pgs.

International Preliminary Report on Patentability for International Application PCT/US2014/056615, dated Mar. 22, 2016, dated Mar. 31, 2016, 11 Pgs.

International Search Report and Written Opinion for International Application No. PCT/US2013/050614, Completed May 7, 2014, dated May 7, 2014, 12 pgs.

International Search Report and Written Opinion for International Application No. PCT/US2018/022020, completed Jul. 2, 2018, dated Jul. 3, 2018, 12 Pgs.

International Search Report and Written Opinion for International Application PCT/US2013/047950, completed Oct. 8, 2013, dated Oct. 10, 2013, 9 pgs.

International Search Report and Written Opinion for International Application PCT/US2014/033510, completed Jan. 8, 2015, dated Jan. 8, 2015, 11 Pgs.

International Search Report and Written Opinion for International Application PCT/US2014/056615, completed Dec. 29, 2014, dated Dec.30, 2014, 13 Pgs.

"Corrosion of Titanium and Titanium Alloys", Total Materia., printed Feb. 16, 2016 from http://www.totalmateria.com/Article24.htm, published Sep. 2001, 4 pgs.

"Gear", Dictionary.com. Accessed Aug. 30, 2016.

"Group 4 element", Wikipedia. https://en.wikipedia.org/wiki/Group_4_element. Published Jun. 11, 2010. Accessed Aug. 24, 2016.

"Harmonic Drive AG", website, printed from http://harmoncdrive.aero/?idcat=471, Feb. 20, 2014, 2 pgs.

"Harmonic Drive Polymer GmbH", printed Feb. 20, 2014 from http://www.harmonicdrive.de/English/the-company/subsidiaries/harmonic-drive-polymer-gmbh.html, 1 pg.

Mahbooba et al., "Additive manufacturing of an iron-based bulk metallic glass larger than the critical casting thickness", Applied Materials Today, Feb. 27, 2018, vol. 11, pp. 264-269.

Narayan et al., "On the hardness and elastic modulus of bulk metallic glass matrix composites", Scripta Materialia, Jun. 9, 2010, vol. 63, Issue 7, pp. 768-771.

Ni et al., "High performance amorphous steel coating prepared by HVOF thermal spraying", Journal of Alloys and Compounds, Jan. 7, 2009, vol. 467, pp. 163-167, Nov. 29, 2007.

Nishiyama et al., "Recent progress of bulk metallic glasses for strain-sensing devices", Materials Science and Engineering: A, Mar. 25, 2007, vols. 449-451, pp. 79-83.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.

Parlar et al., "Sliding tribological characteristics of Zr-based bulk metallic glass", Intermetallics, Jan. 2008, vol. 16, pp. 34-41.

(56) References Cited

OTHER PUBLICATIONS

Pauly et al., "Modeling deformation behavior of Cu—Zr—Al bulk metallic glass matrix composites", Applied Physics Letters, Sep. 2009, vol. 95, pp. 101906-1-101906-3.
Pauly et al., "Processing Metallic Glasses by Selective Laser Melting", Materials Today, Jan./Feb. 2013, vol. 16, pp. 37-41.
Pauly et al., "Transformation-mediated ductility in CuZr-based bulk metallic glasses", Nature Materials, May 16, 2010, vol. 9, Issue 6, pp. 473-477.
Ponnambalam et al., "Fe-based bulk metallic glasses with diameter thickness larger than one centimeter", J Mater Res, Feb. 17, 2004. vol. 19; pp. 1320-1323.
Porter et al., "Incorporation of Amorphous Metals into MEMS for High Performance and Reliability", Rockwell Scientific Company, Final Report, Nov. 1, 2003, 41 pgs.
Prakash et al., "Sliding wear behavior of some Fe-, Co-and Ni-based metallic glasses during rubbing against bearing steel", Tribology Letters, May 1, 2000, vol. 8, pp. 153-160.
Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.
Ramamurty et al., "Hardness and plastic deformation in a bulk metallic glass", Acta Materialia, Feb. 2005, vol. 53, pp. 705-717.
Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.
Rigney et al., "The Evolution of Tribomaterial During Sliding: A Brief Introduction", Tribol. Lett, Jul. 1, 2010, vol. 39, pp. 3-7.
Roberts et al., "Cryogenic Charpy impact testing of metallic glass matrix composites", Scripta Materialia, Nov. 11, 2011, 4 pgs.
Sanders et al., "Stability of Al-rich glasses in the Al—La—Ni system", 2006, Intermetallics, 14, pp. 348-351.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138.
Shen et al., "3D printing of large, complex metallic glass structures", Materials and Design, Mar. 2017, vol. 117, pp. 213-222.
Shen et al., "Exceptionally high glass-forming ability of an FeCoCrMoCBY alloy", Applied Physics, Apr. 5, 2005, vol. 86, pp. 151907-1-151907-3.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685.
Song et al., "Strategy for pinpointing the formation of B2 CuZr in metastable CuZr-based shape memory alloys", Acta Materialia, Aug. 6, 2011, vol. 59, pp. 6620-6630.
Sun et al., "Fiber metallic glass laminates", Dec. 2010, J. Mater. Res., vol. 25, No. 12, pp. 2287-2291.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion resistance of Cu based bulk metallic glasses", Journal of Non-Crystalline Solids, Oct. 18, 2004, vol. 347, pp. 268-272.
Tam et al., "Abrasive wear of $Cu_{60}Zr_{30}Ti_{10}$ bulk metallic glass", Materials Science and Engineering, Apr. 1, 2004, vol. A384 pp. 138-142.
Tan et al., "Synthesis of La-based in-situ bulk metallic glass matrix composite", Intermetallics, Nov. 2002, vol. 10, Issues 11-12, pp. 1203-1205.

Tao et al., "Effect of rotational sliding velocity on surface friction and wear behavior in Zr-based bulk metallic glass", Journal of Alloys and Compounds, Mar. 4, 2010, vol. 492, pp. L36-L39.
Tao et al., "Influence of isothermal annealing on the micro-hardness and friction property in CuZrAl bulk metallic glass", Advanced Materials Research, Jan. 1, 2011, vols. 146-147, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in studying the fatigue behavior of Zr-based bulk-metallic glasses and their composites", Intermetallics, Mar. 6, 2009, vol. 17, pp. 579-590.
Whang et al., "Microstructures and age hardening of rapidly quenched Ti—Zr—Si alloys", Journal of Materials Science Letters, 1985, vol. 4, pp. 883-887.
Wikipedia, "Harmonic Drive", printed Feb. 20, 2014, 4 pgs.
Wu et al., "Bulk Metallic Glass Composites with Transformation-Mediated Work-Hardening and Ductility", Adv. Mater., Apr. 26, 2010, vol. 22, pp. 2770-2773.
Wu et al., "Dry Sliding tribological behavior of Zr-based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr-based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin, Enhuai et al. "Microstructure and mechanical properties of a spray-formed Ti-based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett., Sep. 20, 2012, vol. 101, pp. 121603-1-121603-4.
Zhang et al., "Wear behavior of a series of Zr-based bulk metallic glasses", Materials Science and Engineering, Feb. 25, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta-particulate reinforced Zr-based bulk metallic glass matrix composite with tensile plasticity", Scripta Materialia, Mar. 2010, vol. 62, Issue 5, pp. 278-281.
Zhuo et al., "Spray formed Al-based amorphous matrix nanocomposite plate", ScienceDirect, Journal of Alloys and Compounds, Mar. 1, 2011, vol. 509, pp. L169-L173.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.

(56) References Cited

OTHER PUBLICATIONS

Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.

Ashby et al., "Metallic glasses of structural materials", Scripta Materialia, Feb. 2006, vol. 54, pp. 321-326.

Bakkal, "Sliding tribological characteristics of Zr-based bulk metallic glass under lubricated conditions", Intermetallics, Mar. 19, 2010, vol. 18, pp. 1251-1253.

Bardt et al., "Micromolding three-dimensional amorphous metal structures", J. Mater. Res, Feb. 2007, vol. 22, No. 2, pp. 339-343.

Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.

Boopathy et al., "Near-threshold fatigue crack growth in bulk metallic glass composites", J. Mater. Res., vol. 24, No. 12, pp. 3611-3619, Dec. 2009.

Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317.

Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs., Oct. 1, 2001.

Cadney et al., "Cold gas dynamic spraying as a method for freeforming and joining materials", Science Direct, Surface & Coatings Technology, Mar. 15, 2008, vol. 202, pp. 2801-2806.

Calin et al., "Improved mechanical behavior of Cu—Ti-based bulk metallic glass by in situ formation of nanoscale precipitates", Scripta Materialia, Mar. 17, 2003, vol. 48, pp. 653-658.

Chen et al., "Elastic Constants, Hardness and Their Implications to Flow Properties of Metallic Glasses", Journal of Non-crystalline Solids, Sep. 1, 1975, vol. 18, pp. 157-171.

Chen et al., "Formation of Micro-Scale Precision Flexures Via Molding of Metallic Glass", Proceeding of the Annual Meeting of the ASPE, Monterey, CA, 2006, pp. 283-286.

Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.

Cheng, J. B. "Characterization of mechanical properties of FeCrBSiMnNbY metallic glass coatings", J Mater Sci., Apr. 16, 2009, vol. 44, pp. 3356-3363.

Cheng et al., "Correlation of the microstructure and mechanical properties of Zr-based in-situ bulk metallic glass matrix composites", Intermetallics, Sep. 24, 2010, vol. 18, Issue 12, pp. 2425-2430.

Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.

Conner et al., "Shear band spacing under bending of Zr-based metallic glass plates", Acta Materialia, Jan. 27, 2004, vol. 52, pp. 2429-2434.

Conner et al., "Shear bands and cracking of metallic glass plates in bending", Journal of Applied Physics, Jul. 15, 2003, vol. 94, No. 2, pp. 904-911.

Dai et al., "A new centimeter-diameter Cu-based bulk metallic glass", Scripta Materialia, Jan. 20, 2006, vol. 54, pp. 1403-1408.

Dai et al., "High-performance bulk Ti—Cu—Ni—Sn—Ta nanocomposites based on a dendrite-eutectic microstructure", Journal of Materials Research, Sep. 2004vol. 19, No. 9, pp. 2557-2566.

Davis, "Hardness/Strength Ratio of Metallic Glasses", Scripta Metallurgica, Feb. 18, 1975, vol. 9, pp. 431-436.

De Beer et al., "Surface Folds Make Tears and Chips", Physics, Sep. 4, 2012, vol. 100, 3 pgs.

Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.

Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.

Duan et al., "Lightweight Ti-based bulk metallic glasses excluding late transition metals", Scripta Materialia, Mar. 2008, vol. 58, pp. 465-468.

Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78.

Fan et al., "Metallic glass matrix composite with precipitated ductile reinforcement", Applied Physics Letters, Aug. 5, 2002, vol. 81, Issue 6, pp. 1020-1022.

Fleury et al., "Tribological properties of bulk metallic glasses", Materials Science and Engineering, Jul. 2004, vol. A375-377, pp. 276-279.

Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.

Fu et al., "Sliding behavior of metallic glass Part I. Experimental investigations", Wear, Oct. 2001, vol. 250, pp. 409-419.

Ganesan et al., "Bonding behavior studies of cold sprayed copper coating on the PVC polymer substrate", Surface & Coatings Technology, Jul. 10, 2012, vol. 207, pp. 262-269.

Garrett et al., "Effect of microalloying on the toughness of metallic glasses", Applied Physics Letter, Dec. 12, 2012, vol. 101, 241913-1-241913-3.

Gleason Corporation, "Gear Product News", Introducing genesis, The Next Generation in Gear Technology, Apr. 2006, 52 pgs.

Gloriant, "Microhardness and abrasive wear resistance of metallic glasses and nanostructured composite materials", Journal of Non-Crystalline Solids, Feb. 2003, vol. 316, pp. 96-103.

Greer, "Partially or fully devitrified alloys for mechanical properties", Materials and Science and Engineering, May 31, 2001, vol. A304, pp. 68-72.

Greer et al., "Wear resistance of amorphous alloys and related materials", International Materials Reviews, Apr. 1, 2002, vol. 47, No. 2, pp. 87-112.

Guo et al., "Tensile ductility and necking of metallic glass", Nature Materials, Oct. 2007, vol. 6, pp. 735-739.

Ha et al., "Tensile deformation behavior of two Ti-based amorphous matrix composites containing ductile β dendrites", Materials Science and Engineering: A, May 28, 2012, vol. 552, pp. 404-409.

Hale, "Principles and Techniques for Designing Precision Machines", Ph.D. Thesis, Feb. 1999, 493 pgs.

Harmon et al., "Anelastic to Plastic Transition in Metallic Glass-Forming Liquids", Physical Review Letters, Sep. 28, 2007, vol. 99, 135502-1-135502-4.

Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.

Hays, C. C. "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.

He et al., "Novel Ti-base nanostructure—dendrite composite with enhanced plasticity", Nature Materials, Jan. 2003, Published Dec. 8, 2002, vol. 2, pp. 33-37, doi: 10.1038/nmat792.

Hejwowski et al., "A comparative study of electrochemical properties of metallic glasses and weld overlay coatings", Vacuum, Feb. 2013, vol. 88, pp. 118-123, Feb. 20, 2012.

Hofmann, "Bulk Metallic Glasses and Their Composites: A Brief History of Diverging Fields", Journal of Materials, Jan. 2013, vol. 2013, 7 pgs.

Hofmann, "Shape Memory Bulk Metallic Glass Composites", Science, Sep. 10, 2010, vol. 329, pp. 1294-1295.

Hofmann, D. C. "Development of tough, low-density titanium-based bulk metallic glass matrix composites with tensile ductility", PNAS, Dec. 23, 2008, vol. 105, pp. 20136-20140.

Roberts, "Developing and Characterizing Bulk Metallic Glasses for Extreme Applications", XP055731434, Retrieved from the Internet

(56) References Cited

OTHER PUBLICATIONS (Dec. 16, 2013): URL:https://thesis.library.caltech.edu/8049/141/Scott_Roberts_thesis_2013_Complete_ Thesis. pdf [retrieved on Sep. 17, 2020].

* cited by examiner

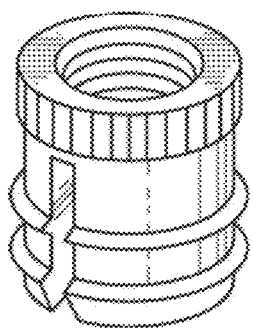 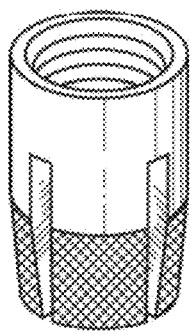 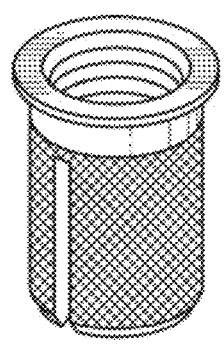 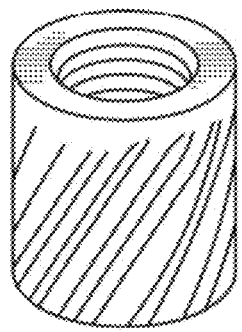
FIG. 4A  FIG. 4B  FIG. 4C  FIG. 4D
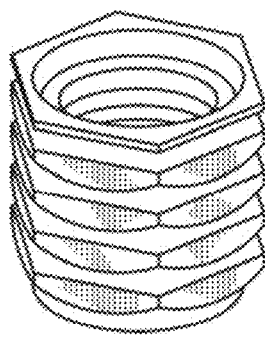 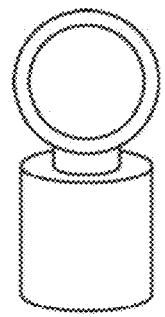 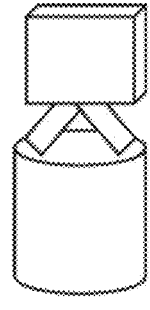
FIG. 4E  FIG. 4F  FIG. 4G
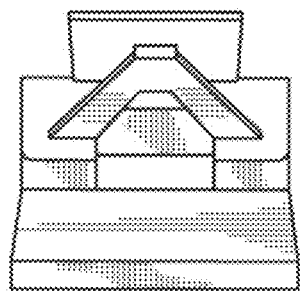 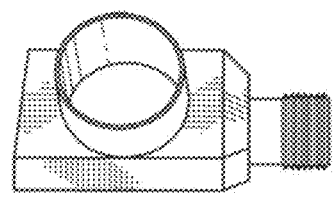
FIG. 4H  FIG. 4I

SYSTEMS AND METHODS FOR STRUCTURALLY INTERRELATING COMPONENTS USING INSERTS MADE FROM METALLIC GLASS-BASED MATERIALS

CROSS-REFERENCE TO RELATED APPLICATIONS

The current application is a continuation of U.S. application Ser. No. 15/067,561, filed Mar. 11, 2016, which application claims priority to U.S. Provisional Application No. 62/131,467, filed Mar. 11, 2015, the disclosures of which are incorporated herein by reference in their entireties.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to structurally interrelating components using inserts fabricated from metallic glass-based materials.

BACKGROUND

The manufacture of a variety of engineered structures typically relies on fastening, or otherwise structurally interrelating, a plurality of components (e.g. in the form of sheet metal). In many instances, conventionally engineered structures are assembled from components made from heritage engineering materials, e.g. steel, aluminum, titanium, etc. Such materials are advantageous in a number of respects, e.g. they are characterized by the requisite toughness for a host of engineering applications. Moreover, such heritage engineering materials can be readily amenable to being adjoined to other engineering materials. For example, threaded holes (which can accommodate screws/bolts) can be practicably machined into steel-based components.

Many modern structures rely on the implementation of composite materials that may not be as easily machinable as heritage engineering materials. For example, carbon fiber composites typically cannot be easily threaded. Accordingly, in many instances, to allow carbon fiber composite materials to be adjoined to other components, threaded inserts are embedded within carbon fiber composite materials that can more easily enable them to be adjoined to other components. For instance, holes can be drilled out of a carbon composite material, and threaded inserts that define threaded holes—typically machined from heritage engineering materials (e.g. steel, aluminum, titanium)—can be epoxy bonded within the holes drilled in the carbon composite material. The embedded threaded inserts can thereby enable another component (e.g. sheet metal made from steel) to be fastened to the carbon fiber composite.

SUMMARY OF THE INVENTION

Systems and methods in accordance with embodiments of the invention operate to structurally interrelate two components using inserts made from metallic glass-based materials. In one embodiment, a method of structurally interrelating two components includes: forming an insert from a metallic glass-based composition; where the formed insert includes a metallic glass-based material; affixing the insert to a first component; and structurally interrelating the second component to the first component using the insert.

In another embodiment, forming an insert from a metallic glass-based composition includes using one of: a thermoplastic forming technique; and a casting technique.

In yet another embodiment, the formed insert includes a textured outer surface.

In still another embodiment, the formed insert is a threaded insert.

In still yet another embodiment, the formed insert includes extensions that are configured to deploy as the insert is engaged by a screw.

In a further embodiment, the formed insert includes an eye-hook structure.

In a yet further embodiment, the formed insert conforms to one of a cup-shaped geometry and a cone-shaped geometry.

In a still further embodiment, the metallic glass-based composition is based on one of: Ti, Zr, Cu, Ni, Fe, Pd, Pt, Ag, Au, Al, Hf, W, Ti—Zr—Be, Cu—Zr, Zr—Be, Ti—Cu, Zr—Cu—Ni—Al, Ti—Zr—Cu—Be, and combinations thereof.

In a still yet further embodiment, the metallic glass-based composition is based on titanium.

In another embodiment, affixing the formed insert to a first component includes epoxy bonding the formed insert to the first component.

In still another embodiment, affixing the formed insert to a first component includes press fitting the formed insert in to the first component.

In yet another embodiment, the formed insert is a threaded insert such that when it is engaged by a screw, it expands laterally and thereby better adheres to the first component.

In still yet another embodiment, the first component is a carbon composite material.

In a further embodiment, the metallic glass-based material is a titanium-based metallic glass-based material.

In a still further embodiment, the formed insert is a threaded insert, and structurally interrelating the second component to the first component includes fastening the second component to the first component using a screw and the threaded insert.

In a yet further embodiment, structurally interrelating the second component to the first component includes structurally aligning the second component to the first component.

In a still yet further embodiment, an insert configured to structurally interrelate two components includes a metallic glass-based material.

In another embodiment, the insert is a threaded insert.

In yet another embodiment, the insert includes an eye-hook structure.

In still another embodiment, the insert includes a titanium-based metallic glass-based material.

BRIEF DESCRIPTION OF THE DRAWINGS

FIGS. 4A-4I illustrate a variety of insert geometries that can be fabricated in accordance with certain embodiments of the invention.

DETAILED DESCRIPTION

Figure 1:
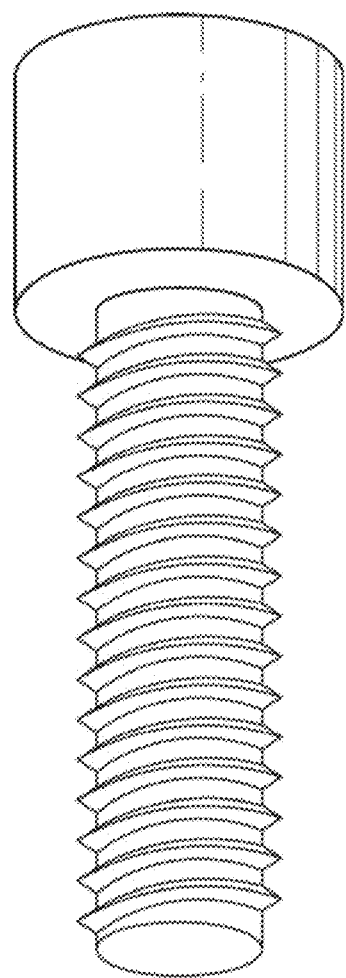
FIG. 1 illustrates a bolt cast from a MG-based material, demonstrating that MG-based materials can be cast into shapes that include intricate features such as threads in accordance with certain embodiments of the invention.

Turning now to the drawings, systems and methods for structurally interrelating two components using inserts made from metallic glass-based materials are illustrated. In many embodiments, threaded inserts that include metallic glass-based materials are embedded within at least a first component to be adjoined to a second component; the threaded insert is then utilized in the adjoining of the at least two components. In a number of instances, cup and cone-shaped inserts that include metallic glass-based materials are embedded within first and second components, and the cup and cone-shaped inserts are used to structurally align the first and second components.

Metallic glasses, also known as amorphous alloys, embody a relatively new class of materials that is receiving much interest from the engineering and design communities. Metallic glasses are characterized by their disordered atomic-scale structure in spite of their metallic constituent elements—i.e. whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, metallic glass materials lend themselves to relatively easy processing in certain respects. For example, the forming of metallic glass materials can be compatible with injection molding processes. Thus, for example, metallic glass compositions can be cast into desired shapes.

Nonetheless, the practical implementation of metallic glasses presents certain challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g. on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g. greater than 1 mm). These metallic glass compositions that can be made to be thicker are known as 'bulk metallic glasses' ("BMGs"). As can be appreciated, such BMGs can be better suited for investment molding operations.

In addition to the development of BMGs, 'bulk metallic glass matrix composites' (BMGMCs) have also been developed. BMGMCs are characterized in that they possess the amorphous structure of BMGs, but they also include crystalline phases of material within the matrix of amorphous structure. For example, the crystalline phases can exist in the form of dendrites. The crystalline phase inclusions can impart a host of favorable materials properties on the bulk material. For example, the crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

The potential of metallic glass-based materials continues to be explored, and developments continue to emerge. For example, in U.S. patent application Ser. No. 13/928,109, D. Hofmann et al. disclose the implementation of metallic glass-based materials in macroscale gears. The disclosure of U.S. patent application Ser. No. 13/928,109 is hereby incorporated by reference in its entirety, especially as it pertains to metallic glass-based materials, and their implementation in macroscale gears. Likewise, in U.S. patent application Ser. No. 13/942,932, D. Hofmann et al. disclose the implementation of metallic glass-based materials in macroscale compliant mechanisms. The disclosure of U.S. patent application Ser. No. 13/942,932 is hereby incorporated by reference in its entirety, especially as it pertains to metallic glass-based materials, and their implementation in macroscale compliant mechanisms. Moreover, in U.S. patent application Ser. No. 14/060,478, D. Hofmann et al. disclose techniques for depositing layers of metallic glass-based materials to form objects. The disclosure of U.S. patent application Ser. No. 14/060,478 is hereby incorporated by reference especially as it pertains to metallic glass-based materials, and techniques for depositing them to form objects. Furthermore, in U.S. patent application Ser. No. 14/163,936, D. Hofmann et al., disclose techniques for additively manufacturing objects so that they include metallic glass-based materials. The disclosure of U.S. patent application Ser. No. 14/163,936 is hereby incorporated by reference in its entirety, especially as it pertains to metallic glass-based materials, and additive manufacturing techniques for manufacturing objects so that they include metallic glass-based materials. Additionally, in U.S. patent application Ser. No. 14/177,608, D. Hofmann et al. disclose techniques for fabricating strain wave gears using metallic glass-based materials. The disclosure of U.S. patent application Ser. No. 14/177,608 is hereby incorporated by reference in its entirety, especially as it pertains to metallic glass-based materials, and their implementation in strain wave gears. Moreover, in U.S. patent application Ser. No. 14/178,098, D. Hofmann et al., disclose selectively developing equilibrium inclusions within an object constituted from a metallic glass-based material. The disclosure of U.S.

patent application Ser. No. 14/178,098 is hereby incorporated by reference, especially as it pertains to metallic glass-based materials, and the tailored development of equilibrium inclusions within them. Furthermore, in U.S. patent application Ser. No. 14/252,585, D. Hofmann et al. disclose techniques for shaping sheet materials that include metallic glass-based materials. The disclosure of U.S. patent application Ser. No. 14/252,585 is hereby incorporated by reference in its entirety, especially as it pertains to metallic glass-based materials and techniques for shaping sheet materials that include metallic glass-based materials. Additionally, in U.S. patent application Ser. No. 14/259,608, D. Hofmann et al. disclose techniques for fabricating structures including metallic glass-based materials using ultrasonic welding. The disclosure of U.S. patent application Ser. No. 14/259,608 is hereby incorporated by reference in its entirety, especially as it pertains to metallic glass-based materials and techniques for fabricating structures including metallic glass-based materials using ultrasonic welding. Moreover, in U.S. patent application Ser. No. 14/491,618, D. Hofmann et al. disclose techniques for fabricating structures including metallic glass-based materials using low pressure casting. The disclosure of U.S. patent application Ser. No. 14/491,618 is hereby incorporated by reference in its entirety, especially as it pertains to metallic glass-based materials and techniques for fabricating structures including metallic glass-based materials using low pressure casting. Furthermore, in U.S. patent application Ser. No. 14/660,730, Hofmann et al. disclose metallic glass-based fiber metal laminates. The disclosure of U.S. patent application Ser. No. 14/660,730 is hereby incorporated by reference in its entirety, especially as it pertains to metallic glass-based fiber metal laminates. Additionally, in U.S. patent application Ser. No. 14/971,848, A. Kennett et al. disclose techniques for manufacturing gearbox housings made from metallic glass-based materials. The disclosure of U.S. patent application Ser. No. 14/971,848, is hereby incorporated by reference in its entirety, especially as it pertains to the manufacture of metallic glass-based gearbox housings.

Notwithstanding all of these developments, the vast potential of metallic glass-based materials has yet to be fully appreciated. For instance, the fabrication of inserts that can be used to facilitate the structural interrelationship between two components from metallic glass-based materials has yet to be fully explored. Such inserts have typically been fabricated from conventional engineering materials such as steel, aluminum, and/or titanium. This is in part due to the conventional desire to not have two dissimilar metals in intimate contact with each other—i.e. a screw and the respective threaded insert each including dissimilar metals—for fear of the effects of galvanic corrosion. However, MG-based materials can be made to be relatively averse to the effects of galvanic corrosion, and can also be made to develop a robust oxide layer that can further inhibit occurrences of galvanic corrosion. In other words, MG-based materials can be made to practicably operate in intimate contact with dissimilar metals. Whereas such inserts have typically been fabricated from conventional engineering materials (e.g. steel, aluminum, or titanium), they can substantially benefit from the materials properties that many MG-based materials can offer. For instance, inserts made from MG-based materials can have a relatively higher elastic strain limit, better resistance to wear, higher hardness, lower density, better corrosion resistance, and/or better resilience to extreme environments relative to conventionally fabricated inserts. Additionally, MG-based materials can be further advantageous insofar as their inherent mechanical properties can be tunable via alloying. Moreover, MG-based materials are amenable to casting and other thermoplastic forming processes, which can greatly enhance manufacturing efficiency. By contrast, casting processes are not conventionally used in the fabrication of inserts from heritage engineering materials for a number of reasons. For example, the most appropriate conventional materials for casting techniques are softer materials, which typically are not wear resistant and thereby not best-suited for, e.g., threaded insert applications where screws may be wearing on the respective insert. Methods for structurally interrelating two components using inserts that include MG-based materials in accordance with many embodiments of the invention are now discussed below.

Methods for Structurally Interrelating Two Components Using Inserts Fabricated From MG-Based Materials In many embodiments of the invention, two components are structurally interrelated using inserts fabricated from MG-based materials. While conventional inserts fabricated from heritage engineering materials have been effective in many respects, fabricating these inserts from MG-based materials can offer a host of previously unrealized advantages. As alluded to above, MG-based materials can offer unique materials profiles that can be advantageous such inserts. Moreover, MG-based materials are amenable to casting and other thermoplastic forming processes, which can allow for the efficient—and—bulk manufacture of even intricate geometries. For example, FIG. 1 illustrates a screw—including threads—that was entirely cast from a MG-based material; FIG. 1 demonstrates that MG-based materials can be cast into intricate geometric shapes. This level of castability can be harnessed in the creating inserts from metallic glass-based materials.

Figure 2:
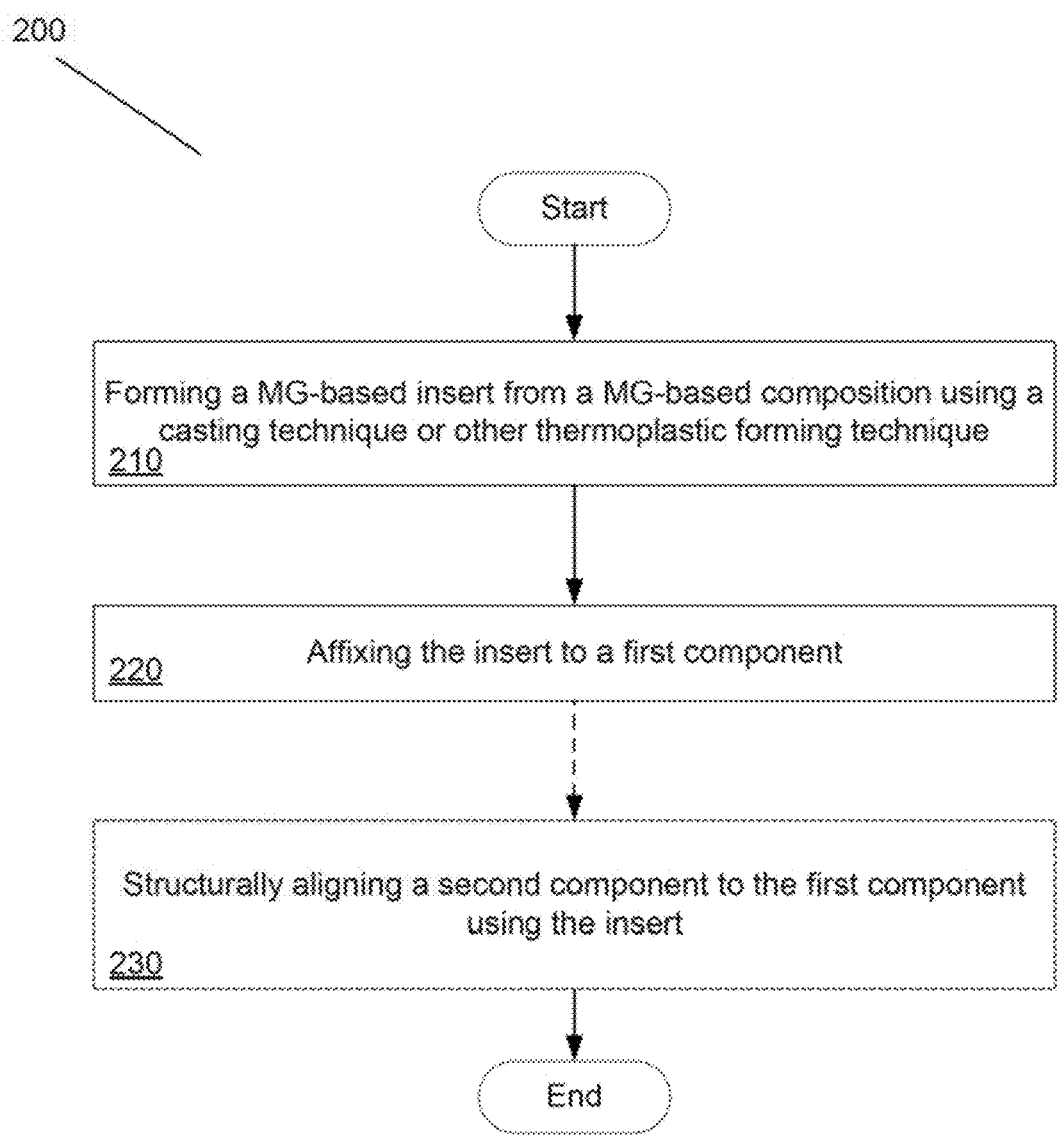
FIG. 2 illustrates a process for structurally interrelating two components using an insert fabricated from a MG-based material in accordance with certain embodiments of the invention.
Figure 3A:
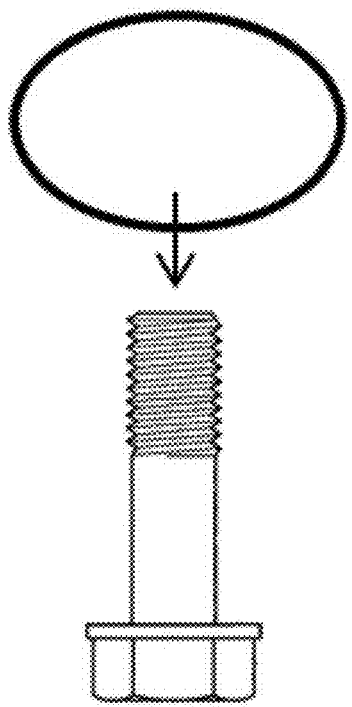
FIGS. 3A-3C illustrate casting a MG-based material to create a threaded insert in accordance with certain embodiments of the invention.
Figure 3B:
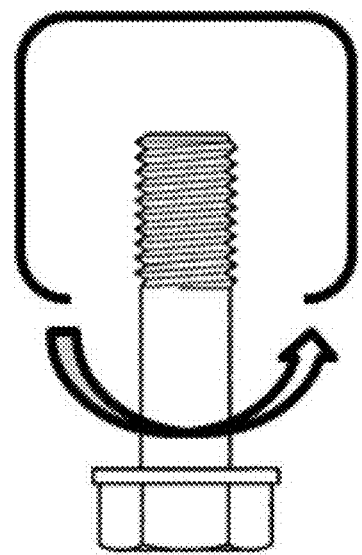
Figure 3C:
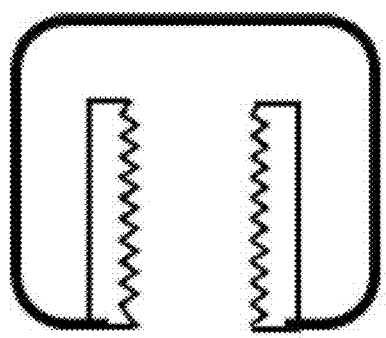
Figure 3C:
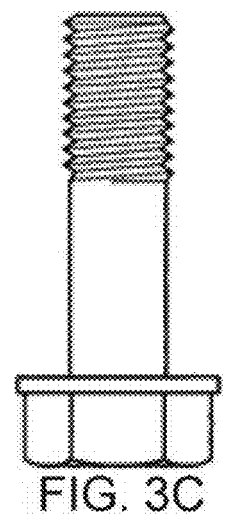

FIG. 2 illustrates a process for structurally interrelating two components in accordance with certain embodiments of the invention. In particular, the method 200 includes forming 210 an insert from a MG-based composition using a casting technique or other thermoplastic forming technique. Any suitable thermoplastic or casting technique can be implemented in accordance with embodiments of the invention. For example, FIGS. 3A-3C schematically illustrate casting a MG-based material to create a threaded insert in accordance with many embodiments of the invention. In particular, FIG. 3A illustrates a MG-based composition in relation to a mold in the shape of a screw; FIG. 3B illustrates casting the MG-based melt around the mold so as to form a MG-based material; and FIG. 3C illustrates removing the cast threaded insert from the plug. In many instances, the forming 210 additionally includes other manufacturing procedures, such as machining. For instance, the forming 210 can include roughening the outer surface of the insert via any of a variety of texturizing techniques.

Note that any suitable MG-based material can be incorporated in accordance with embodiments of the invention; embodiments of the invention are not limited to particular compositions. For example, in many instances, the alloy composition is a composition that is based on one of: Ti, Zr, Cu, Ni, Fe, Pd, Pt, Ag, Au, Al, Hf, W, Ti—Zr—Be, Cu—Zr, Zr—Be, Ti—Cu, Zr—Cu—Ni—Al, Ti—Zr—Cu—Be and combinations thereof. In the instant context, the term 'based on' can be understood to mean that the specified element(s) are present in the greatest amount relative to any other present elements. Additionally, within the context of the instant application, the term "MG-based composition" can be understood reference an element, or aggregation of elements, that are capable of forming a metallic glass-based material (e.g. via being exposed to a sufficiently rapid, but viable, cooling rate). While several examples of suitable metallic glass-based materials are listed above, it should be reiterated that any suitable metallic glass-based composition can be incorporated in accordance with embodiments of the invention; for example, any of the metallic glass-based compositions listed in the disclosures cited and incorporated by reference above can be implemented. In many instances, the particular MG-based composition to be cast is based on an assessment of the anticipated operating environment for the insert. Thus, for example, in many instances the implemented MG-based composition is based the desire to match the coefficient of expansion with that of the component material that it is going to be affixed to. Accordingly, in many embodiments, titanium-based MG-based materials are implemented for use in conjunction with carbon composite materials. In particular, both titanium-based MG-based materials and carbon composite materials are generally characterized by relatively low coefficients of thermal expansion. In this way, when the insert is affixed to the carbon composite, the stresses between the insert and the carbon composite (e.g. in the epoxy bonding) can be reduced. Note also that both titanium-based MG-based materials and carbon composites are relatively light weight materials, and can thereby be well-suited for space applications. In particular, titanium-based MG-based inserts can offer high hardness at a relatively low density.

In many instances, the selection of the MG-based material to be implemented is based on the desire for one of: environmental resilience, toughness, wear resistance, hardness, density, machinability, and combinations thereof. For reference, Tables 1-6 list materials data that can be relied on in selecting a metallic glass-based composition to be implemented.

TABLE 1

Material Properties of MG-Based Materials relative to Heritage Engineering Materials

| Material | Density (g/cc) | Stiffness, E (GPa) | Tensile Yield (MPa) | Tensile UTS (MPa) | Elastic Limit (%) | Specific Strength | Hardness (HRC) |
|---|---|---|---|---|---|---|---|
| SS 15500 H1024 | 7.8 | 200 | 1140 | 1170 | <1 | 146 | 36 |
| Ti—6Al—4V STA | 4.4 | 114 | 965 | 1035 | <1 | 219 | 41 |
| Ti—6Al—6V—4Sn STA | 4.5 | 112 | 1035 | 1100 | <1 | 230 | 42 |
| Nitronic 60 CW | 7.6 | 179 | 1241 | 1379 | <1 | 163 | 40 |
| Vascomax C300 | 8.0 | 190 | 1897 | 1966 | <1 | 237 | 50 |
| Zr-BMG | 6.1 | 97 | 1737 | 1737 | >1.8 | 285 | 60 |
| Ti-BMGMC | 5.2 | 94 | 1362 | 1429 | >1.4 | 262 | 51 |
| Zr-BMGMC | 5.8 | 75 | 1096 | 1210 | >1.4 | 189 | 48 |

TABLE 2

Material Properties of Select MG-Based Materials as a function of Composition

| name | atomic % | weight % | BMG (%) | bcc (%) | $\rho$ (g/cm$^3$) | $\sigma_y$ (MPa) | $\sigma_{max}$ (MPa) | $\varepsilon_y$ (%) | E (GPa) | $T_s$ (K) |
|---|---|---|---|---|---|---|---|---|---|---|
| DV2 | $Ti_{44}Zr_{20}V_{12}Cu_5Be_{19}$ | $Ti_{41.9}Zr_{36.3}V_{12.1}Cu_{6.3}Be_{1.4}$ | 70 | 33 | 5.13 | 1597 | 1614 | 2.1 | 94.5 | 956 |
| DV1 | $Ti_{48}Zr_{20}V_{12}Cu_5Be_{15}$ | $Ti_{44.3}Zr_{35.2}V_{11.8}Cu_{6.7}Be_{2.6}$ | 53 | 47 | 5.15 | 1362 | 1429 | 2.3 | 94.2 | 955 |
| DV3 | $Ti_{56}Zr_{18}V_{10}Cu_4Be_{12}$ | $Ti_{51.6}Zr_{31.6}V_{9.8}Cu_{4.9}Be_{2.1}$ | 46 | 54 | 5.08 | 1308 | 1309 | 2.2 | 84.0 | 951 |
| DV4 | $Ti_{62}Zr_{15}V_{10}Cu_4Be_9$ | $Ti_{57.3}Zr_{26.4}V_{9.8}Cu_{4.9}Be_{1.6}$ | 40 | 60 | 5.03 | 1086 | 1089 | 2.1 | 83.7 | 940 |
| DVAl1 | $Ti_{60}Zr_{16}V_9Cu_5Al_3Be_9$ | $Ti_{55.8}Zr_{28.4}V_{8.9}Cu_{3.7}Al_{1.6}Be_{1.6}$ | 31 | 69 | 4.97 | 1166 | 1189 | 2.0 | 84.2 | 901 |
| DVAl2 | $Ti_{67}Zr_{11}V_{10}Cu_5Al_2Be_5$ | $Ti_{62.4}Zr_{19.5}V_{9.5}Cu_{6.2}Al_1Be_{0.9}$ | 20 | 80 | 4.97 | 990 | 1000 | 2.0 | 78.7 | 998 |
| Ti-6-4a | $Ti_{86.1}Al_{10.3}V_{3.6}$ | $Ti_{90}Al_6V_4$ (Grade 5 Annealed) | na | na | 4.43 | 754 | 882 | 1.0 | 113.8 | 1877 |
| Ti-6-4s | $Ti_{86.1}Al_{10.3}V_{3.6}$[Ref] | $Ti_{99}Al_6V_4$ (Grade 5 STA) | na | na | 4.43 | 1100 | 1170 | ~1 | 114.0 | 1877 |
| CP-Ti | $Ti_{100}$ | $Ti_{100}$ (Grade 2) | na | na | 4.51 | 380 | 409 | 0.7 | 105.0 | ~1930 |

TABLE 3

Material Properties of Select MG-Based Materials as a function of Composition

| Alloy | $\sigma_{max}$ (MPa) | $\varepsilon_{tot}$ (%) | $\sigma_z$ (MPa) | $\varepsilon_y$ (%) | E (GPa) | $\rho$ (g/cm$^3$) | G (GPa) | CIT (J) | RoA (%) | $\nu$ |
|---|---|---|---|---|---|---|---|---|---|---|
| $Zr_{38.6}Ti_{31.4}Nb_7Cu_{6.9}Be_{19.1}$ (DH1) | 1512 | 9.58 | 1474 | 1.98 | 84.3 | 5.6 | 30.7 | 26 | 44 | 0.371 |
| $Zr_{38.3}Ti_{32.9}Nb_{7.3}Cu_{6.2}Be_{15.3}$ (DH2) | 1411 | 10.8 | 1367 | 1.92 | 79.2 | 5.7 | 28.8 | 40 | 50 | 0.373 |
| $Zr_{39.6}Ti_{33.9}Nb_{7.6}Cu_{6.4}Be_{12.5}$ (DH3) | 1210 | 13.10 | 1096 | 1.62 | 75.3 | 5.8 | 27.3 | 45 | 46 | 0.376 |
| $Zr_{41.2}Ti_{13.8}Cu_{12.5}Ni_{10}Be_{22.5}$ (Vitreloy 1) | 1737 | 1.98 | — | — | 97.2 | 6.1 | 35.9 | 8 | 0 | 0.355 |
| $Zr_{56.2}Ti_{13.8}Nb_{5.0}Cu_{6.9}Ni_{5.6}Be_{12.5}$ (LM 2) | 1302 | 5.49 | 1046 | 1.48 | 78.8 | 6.2 | 28.6 | 24 | 22 | 0.375 |

TABLE 4

Material Properties as a Function of Composition and Structure, where A is Amorphous, X is Crystalline, and C is Composite

| | A/X/C | 2.0Hv | E (GPa) |
|---|---|---|---|
| (CuZr42Al7Be10)Nb3 | A | 626.5 | 108.5 |
| (CuZr46Al5Y2)Nb3 | A | 407.4 | 76.9 |
| (CuZrAl7Be5)Nb3 | A | 544.4 | 97.8 |
| (CuZrAl7Be7)Nb3 | A | 523.9 | 102.0 |
| Cu40Zr40Al10Be10 | A | 604.3 | 114.2 |
| Cu41Zr40Al7Be7Co5 | C | 589.9 | 103.5 |
| Cu42Zr41Al7Be7Co3 | A | 532.4 | 101.3 |
| Cu47.5Zr46Al4Co0.5 | X | 381.9 | 79.6 |
| Cu47Zr46Al5Y2 | A | 409.8 | 75.3 |
| Cu50Zr50 | X | 325.9 | 81.3 |
| CuZr41Al7Be7Cr3 | A | 575.1 | 106.5 |
| CuZrAl5Be5Y2 | A | 511.1 | 88.5 |
| CuZrAl5Ni3Be4 | A | 504.3 | 95.5 |
| CuZrAl7 | X | 510.5 | 101.4 |
| CuZrAl7Ag7 | C | 496.1 | 90.6 |
| CuZrAl7Ni5 | X | 570.0 | 99.2 |
| Ni40Zr28.5Ti16.5Be15 | C | 715.2 | 128.4 |
| Ni40Zr28.5Ti16.5Cu5Al10 | X | 627.2 | 99.3 |
| Ni40Zr28.5Ti16.5Cu5Be10 | C | 668.2 | 112.0 |
| Ni56Zr17Ti13Si2Sn3Be9 | X | 562.5 | 141.1 |
| Ni57Zr18Ti14Si2Sn3Be6 | X | 637.3 | 139.4 |
| Ti33.18Zr30.51Ni5.33Be22.88Cu8.1 | A | 486.1 | 96.9 |
| Ti40Zr25Be30Cr5 | A | 465.4 | 97.5 |
| Ti40Zr25Ni8Cu9Be18 | A | 544.4 | 101.1 |
| Ti45Zr16Ni9Cu10Be20 | A | 523.1 | 104.2 |
| Vit 1 | A | 530.4 | 95.2 |
| Vit105 (Zr52.5Ti5Cu17.9Ni14.6Al10) | A | 474.4 | 88.5 |
| Vit 106 | A | 439.7 | 88.3 |
| Zr55Cu30Al10Ni5 | A | 520.8 | 87.2 |
| Zr65Cu17.5Al7.5Ni10 | A | 463.3 | 116.9 |
| DH1 | C | 391.1 | 84.7 |
| GHDT (Ti30Zr35Cu8.2Be26.8) | A | 461.8 | 90.5 |

TABLE 5

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| $Zr_{56.2}Cu_{6.9}Ni_{5.6}Ti_{13.8}Nb_{5.0}Be_{12.5}$ Composites | 1480 | 3 × 3 × 30 | 4PB | 25 | 0.1 | ~296 | 0.200 |
| $Zr_{41.2}Cu_{12.5}Ni_{10}Ti_{13.8}Nb_{5.0}Be_{22.5}$ | 1900 | 3 × 3 × 50 | 4PB | 25 | 0.1 | ~152 | 0.080 |
| $Zr_{41.2}Cu_{12.5}Ni_{10}Ti_{13.8}Nb_{5.0}Be_{22.5}$ | 1900 | 2 × 2 × 60 | 3PB | 10 | 0.1 | 768 | 0.404 |
| $Zr_{41.2}Cu_{12.5}Ni_{10}Ti_{13.8}Nb_{5.0}Be_{22.5}$ | 1900 | 2 × 2 × 60 | 3PB | 10 | 0.1 | 359 | 0.189 |
| $Zr_{44}Ti_{11}Ni_{10}Cu_{10}Be_{25}$ | 1900 | 2.3 × 2.0 × 85 | 4PB | 5-20 | 0.3 | 550 | 0.289 |
| $Zr_{44}Ti_{11}Ni_{10}Cu_{10}Be_{25}$ | 1900 | 2.3 × 2.0 × 85 | 4PB | 5-20 | 0.3 | 390 | 0.205 |
| $Zr_{52.5}Cu_{17.9}Al_{10}Ni_{14.6}Ti_5$ | 1700 | 3.5 × 3.5 × 30 | 4PB | 10 | 0.1 | 850 | 0.500 |
| $(Zr_{58}Ni_{13.6}Cu_{18}Al_{10.4})_{99}Nb_1$ | 1700 | 2 × 2 × 25 | 4PB | 10 | 0.1 | 559 | 0.329 |
| $Zr_{55}Cu_{30}Ni_5Al_{10}$ | 1560 | 2 × 20 × 50 | Plate bend | 40 | 0.1 | 410 | 0.263 |

TABLE 6

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| $Zr_{56.2}Cu_{6.9}Ni_{5.6}Ti_{13.8}Nb_{5.0}Be_{12.5}$ Composites | 1480 | Ø2.98 | TT | 10 | 0.1 | 239 | 0.161 |
| $Zr_{55}Cu_{30}Ni_5Al_{10}$ Nano | 1700 | 2 × 4 × 70 | TT | 10 | 0.1 | ~340 | 0.200 |
| $Zr_{41.2}Cu_{12.5}Ni_{10}Ti_{13.8}Nb_{5.0}Be_{22.5}$ | 1850 | Ø2.98 | TT | 10 | 0.1 | 703 | 0.380 |
| $Zr_{41.2}Cu_{12.5}Ni_{10}Ti_{13.8}Nb_{5.0}Be_{22.5}$ | 1850 | Ø2.98 | TT | 10 | 0.1 | 615 | 0.332 |
| $Zr_{41.2}Cu_{12.5}Ni_{10}Ti_{13.8}Nb_{5.0}Be_{22.5}$ | 1850 | Ø2.98 | TT | 10 | 0.1 | 567 | 0.306 |
| $Zr_{41.2}Cu_{12.5}Ni_{10}Ti_{13.8}Nb_{5.0}Be_{22.5}$ | 1900 | — | CC | 5 | 0.1 | ~1050 | 0.553 |
| $Zr_{41.2}Cu_{12.5}Ni_{10}Ti_{13.8}Nb_{5.0}Be_{22.5}$ | 1900 | — | TC | 5 | −1 | ~150 | 0.079 |
| $Zr_{50}Cu_{40}Al_{10}$ | 1821 | Ø2.98 | TT | 10 | 0.1 | 752 | 0.413 |
| $Zr_{50}Cu_{30}Al_{10}Ni_{10}$ | 1900 | Ø2.98 | TT | 10 | 0.1 | 865 | 0.455 |
| $Zr_{50}Cu_{37}Al_{10}Pd_3$ | 1899 | Ø2.98 | TT | 10 | 0.1 | 983 | 0.518 |
| $Zr_{50}Cu_{37}Al_{10}Pd_3$ | 1899 | Ø5.33 | TT | 10 | 0.1 | ~900 | 0.474 |
| $Zr_{52.5}Cu_{17.9}Al_{10}Ni_{14.6}Ti_5$ | 1660 | 6 × 3 × 1.5 | TT | 1 | 0.1 | — | — |
| $Zr_{52.5}Cu_{17.9}Al_{10}Ni_{14.6}Ti_5$ | 1700 | Ø2.98 | TT | 10 | 0.1 | 907 | 0.534 |
| $Zr_{59}Cu_{20}Al_{10}Ni_9Ti_3$ | 1580 | 6 × 3 × 1.5 | TT | 1 | 0.1 | — | — |
| $Zr_{65}Cu_{15}Al_{10}Ni_{10}$ | 1300 | 3 × 4 × 16 | TT | 20 | 0.1 | ~280 | 0.215 |
| $Zr_{55}Cu_{30}Al_{10}Ni_5$ | 1560 | 1 × 2 × 5 | TT | 0.13 | 0.5 | — | — |

Again, while several examples of MG-based materials that can be suitable for implementation within the instant context, embodiments of the invention are not limited to the materials listed in the tables. Rather, any suitable MG-based material can be implemented in accordance with embodiments of the invention.

Figure 5A:
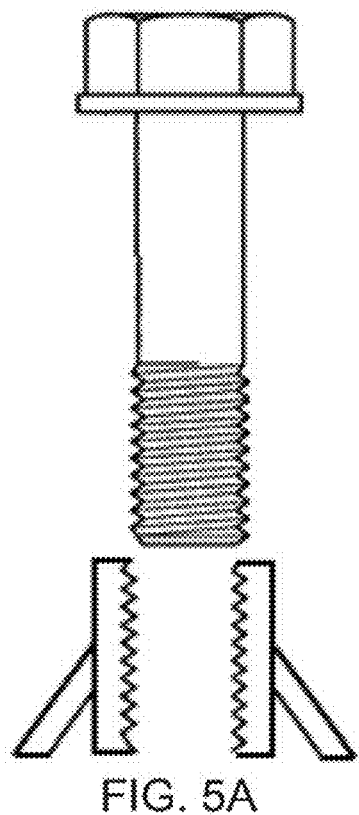
FIGS. 5A-5C illustrate a threaded insert including extensions fabricated from a MG-based material in accordance with certain embodiments of the invention.
Figure 5B:
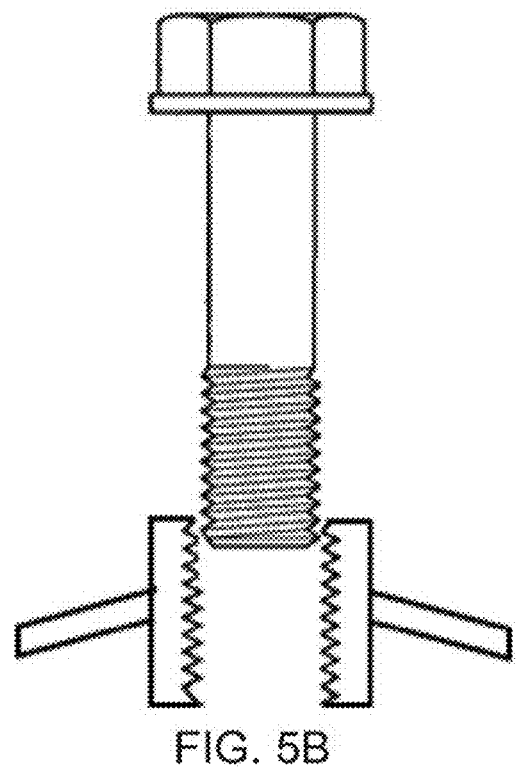
Figure 5C:
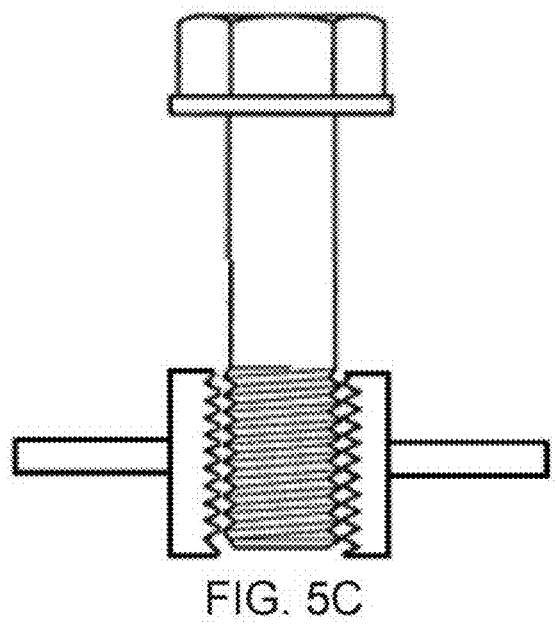

Importantly, the MG-based composition can be cast into any suitable shape that can facilitate the structural interrelationship between two components. For example, FIGS. 4A-4I depict various geometries that can also be implemented in accordance with embodiments of the invention. Note that FIGS. 4A-4E illustrate threaded insert geometries that are characterized by a rough-textured outer surface, which can facilitate the bonding of the insert to a component. Of course, it should be appreciated that while certain rough textured surfaces are depicted, any of a variety of rough-textured surfaces can be incorporated in accordance with embodiments of the invention. FIG. 4F illustrates an eye-hook geometry can be used to facilitate a tethering structural relationship. In many instances, the formed insert is a threaded insert that includes extensions that flare out when engaged by a screw; extensions can serve to better 'grip' an associated component. FIGS. 5A-5C illustrate a threaded insert that includes extensions that deploy when the insert engages a screw in accordance with an embodiment of the invention. In particular, FIG. 5A illustrates a screw and an insert made from a MG-based material in accordance with an embodiment of the invention. FIG. 5B illustrates the screw being inserted into the threaded insert, and the extensions beginning to deploy. FIG. 5C illustrates that the screw is fully engaged with the threaded insert, and the extensions are fully deployed. This type of design can help the insert better adhere to a component that it is affixed to. To be clear, while several designs have been discussed and illustrated, any suitable insert design can be implemented in accordance with embodiments of the invention. For example, in some embodiments, cup and cone-shaped inserts are fabricated. Cup and cone-shaped inserts can be affixed to first and second components respectively, and can be used to align the first and second component materials. To reiterate, any suitable insert shape can be implemented in accordance with embodiments of the invention.

Figure 6A:
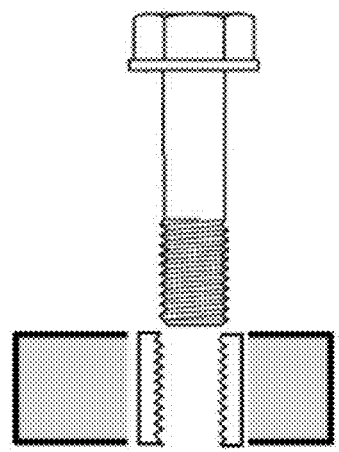
FIGS. 6A-6B illustrate how the elastic properties of a MG-based material can be harnessed to better adhere a respective insert to a component in accordance with certain embodiments of the invention.
Figure 6B:
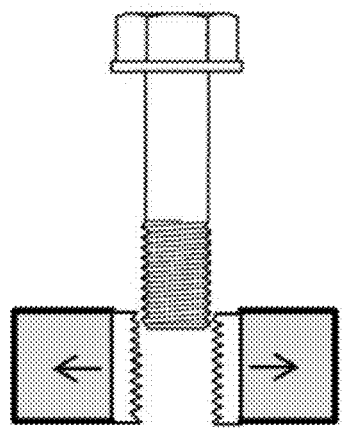

Returning back to FIG. 2, the method 200 further includes affixing 220 the insert to a first component that is to be structurally interrelated to a second component. The insert can be affixed 220 in any suitable way in accordance with embodiments of the invention. For example, in many embodiments, the insert is epoxy bonded to the component. In a number of embodiments, the operation of a mechanical lock (e.g. the extensions depicted in FIGS. 5A-5C) is relied in affixing the insert to the component. Any suitable technique can be used to affix the insert to the component. In some embodiments, the elastic nature of the constituent MG-based material is relied on to allow the insert to better adhere to a respective component. For example, in some embodiments, a threaded insert is affixed to a component via a press fit; subsequently, when a screw engages the threaded insert, it expands laterally, and thereby better adheres to the component. Note that MG-based materials can have elastic limits as high as 2% or more; accordingly they can accommodate a relatively substantial amount of elastic deformation, which in turn can be used to better affix the insert to the component. FIGS. 6A-6B illustrate a threaded insert fabricated from a MG-based material that expands upon engagement with a screw and thereby better adheres to its respective associated component in accordance with an embodiment of the invention. In particular, FIG. 6A depicts the insert press-bonded to an associated component; the depicted gap is meant to indicate that the insert is not as tightly bonded to the component as it could be. FIG. 6B illustrates that as the screw begins to engage the insert, it expands laterally and thereby more strongly adheres to the associated component. While several examples of affixing an insert to a component are discussed, it should be clear that any suitable way of affixing the insert to a first component can be implemented in accordance with embodiments of the invention.

Note that the component that the insert is affixed to can be any suitable component in accordance with embodiments of the invention. In many embodiments, the component is in the form of a sheet (e.g. sheet metal). In numerous embodiments, the component made from a relatively modern material, such as a carbon composite material. To be clear though, the component can take any of a variety of forms in accordance with embodiments of the invention.

Returning back to FIG. 2, the method 200 further includes structurally interrelating 230 a second component to the first component using the insert. In many embodiments, the insert is a threaded insert, a screw is used to fasten the second component to the first component using the threaded insert, and the first and second components are thereby structurally interrelated. In a number of embodiments, the insert is a cup-shaped insert designed to accommodate a cone-shaped geometry, the second component has an included cone-shaped geometry, the cup-shaped insert is used to align the first and second components, and the first and second components are thereby structurally interrelated. While several examples are given, it should be clear that the first and second components can be structurally interrelated in any suitable way in accordance with embodiments of the invention.

Figure 7A:
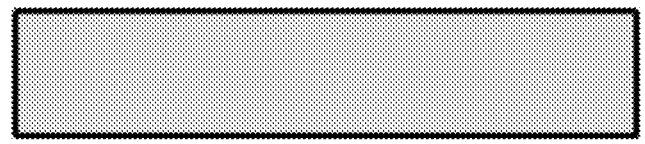
FIGS. 7A-7D schematically depict a process for structurally interrelating two components using an insert fabricated from a MG-based material in accordance with certain embodiments of the invention.
Figure 7B:
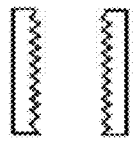
Figure 7C:
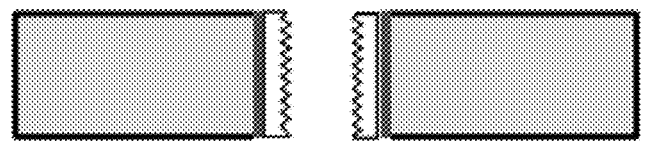
Figure 7D:
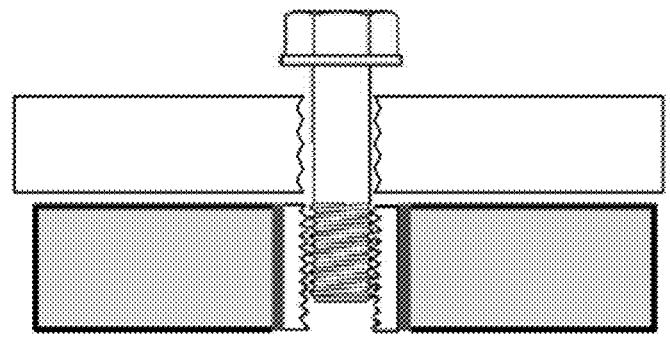

FIGS. 7A-7D schematically illustrates one example of a process in accordance with the method outlined in FIG. 2. In particular, FIG. 7A illustrates a first component to be structurally interrelated to a second component; in the illustrated embodiment, the first component is in the form of a sheet. As alluded to above, the component can be any suitable material in accordance with embodiments of the invention. FIG. 7B illustrates the formation of a threaded insert from a MG-based material. The insert can be formed using any suitable technique in accordance with embodiments of the invention, including any of the above-listed techniques. FIG. 7C illustrates embedding the insert within the first component. In particular, it is depicted that the insert is embedded within the first component using epoxy bonding. Of course, while epoxy bonding is depicted, the insert could have been affixed to the first component using any suitable technique in accordance with embodiments of the invention. FIG. 7D illustrates fastening a second component to the first component using a screw. As can be appreciated from the above discussion, the second component can take any of a variety of forms in accordance with embodiments of the invention. For example, it can conform to any of a variety of suitable geometries, and it can be made from any of a variety of suitable materials. While a certain process has been schematically illustrated in FIGS. 7A-7D, it should be clear that the process described with respect to FIG. 3 can be implemented in any of a variety of ways in accordance with embodiments of the invention.

Figure 8A:
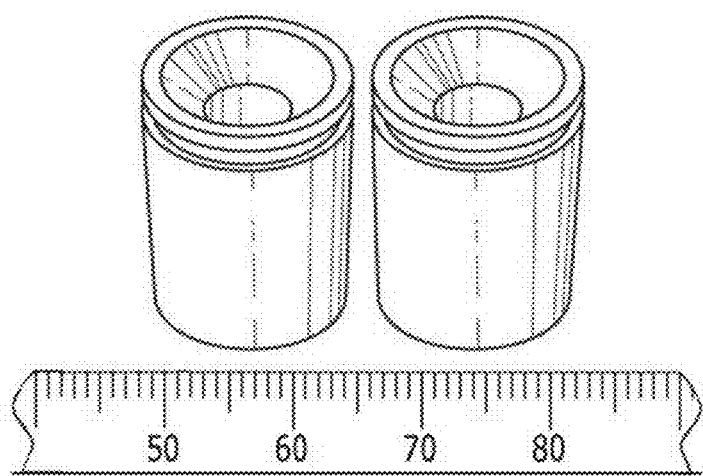
FIGS. 8A-8B illustrate an insert that was fabricated from conventional steel relative to an insert fabricated from a MG-based material in accordance with certain embodiments of the invention.
Figure 8B:
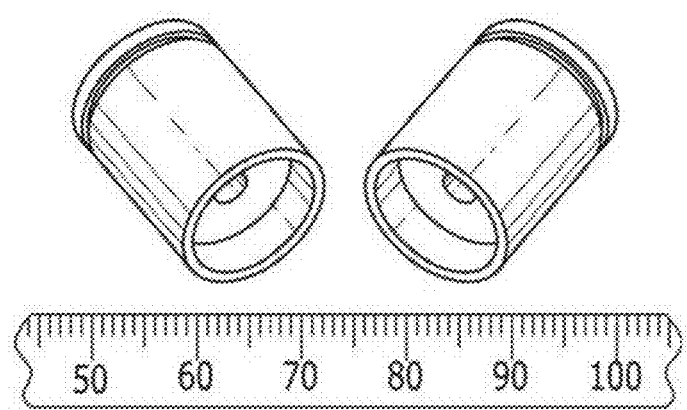

FIGS. 8A-8B illustrate views of a MG-based insert relative to a conventional, steel-based insert. In particular, the MG-based insert appears on the right side of FIGS. 8A and 8B. Note that the two inserts are virtually identical in geometry, which demonstrates the viability of fabricating inserts from MG-based materials.

In general, as can be inferred from the above discussion, the above-mentioned concepts can be implemented in a variety of arrangements in accordance with embodiments of the invention. For example, while the process listed in FIG. 3 recites forming an insert using either a thermoplastic forming technique or a casting technique, in many embodiments, the insert is formed without using one of those techniques. Any suitable manufacturing technique can be used to form an insert from a metallic glass-based material in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An insert configured to structurally interrelate two components comprising:
    an elastically deformable body comprising a metallic glass-based material having an elastic limit of at least 1.4%, the body having an outer surface and defining an inner cavity;
    at least one opening disposed in the outer surface and communicating with the inner cavity;
    wherein the outer surface of the body is adapted to engage a first component; and
    wherein the inner cavity is adapted to engage a second component such that during such engagement at least the outer surface of the body elastically deforms and laterally expands to securely engage the first component.

2. The insert of claim 1, wherein the inner cavity is threaded.

3. The insert of claim 1, wherein the inner cavity comprises an eye-hook structure.

4. The insert of claim 1, wherein the outer surface is textured.

5. The insert of claim 1, wherein the outer surface further comprises extensions configured to deploy within the first component as the insert is engaged by the second component.

6. The insert of claim 1, wherein the inner cavity is one of either a cup-shaped geometry or a cone-shaped geometry.

7. The insert of claim 1, wherein the metallic glass-based composition is based on one of: Ti, Zr, Cu, Ni, Fe, Pd, Pt, Ag, Au, Al, Hf, W, Ti—Zr—Be, Cu—Zr, Zr—Be, Ti—Cu, Zr—Cu—Ni—Al, Ti—Zr—Cu—Be, and combinations thereof.

8. The insert of claim 7, wherein the metallic glass-based composition is based on titanium.

9. The insert of claim 6, wherein the outer surface further comprises a layer of epoxy.

10. The insert of claim 1, wherein the inner cavity is threaded and the second component comprises a threaded screw.

11. The insert of claim 1, wherein the outer surface is threaded.

12. An insert configured to structurally interrelate two components comprising:
    a body comprising a metallic glass-based material having an elastic limit of at least 1.4%, the body having an outer surface and defining an inner cavity;
    at least one opening disposed in the outer surface and communicating with the inner cavity;
    wherein the outer surface of the body is adapted to engage a first component as a press fitting; and
    wherein the inner cavity is threaded and adapted to engage a threaded second component such that during such engagement at least the outer surface of the body elastically deforms and laterally expands to securely engage the first component.

13. The insert of claim 12, wherein the outer surface is textured.

14. The insert of claim 12, wherein the outer surface further comprises extensions configured to deploy within the first component as the insert is engaged by the second component.

15. The insert of claim 12, wherein the inner cavity is one of either a cup-shaped geometry or a cone-shaped geometry.

16. An insert of claim 12, wherein the metallic glass-based composition is based on one of: Ti, Zr, Cu, Ni, Fe, Pd, Pt, Ag, Au, Al, Hf, W, Ti—Zr—Be, Cu—Zr, Zr—Be, Ti—Cu, Zr—Cu—Ni—Al, Ti—Zr—Cu—Be, and combinations thereof.

17. The insert of claim 16, wherein the metallic glass-based composition is based on titanium.

18. The insert of claim 12, wherein the outer surface further comprises a layer of epoxy.

* * * * *